Patented Apr. 9, 1940

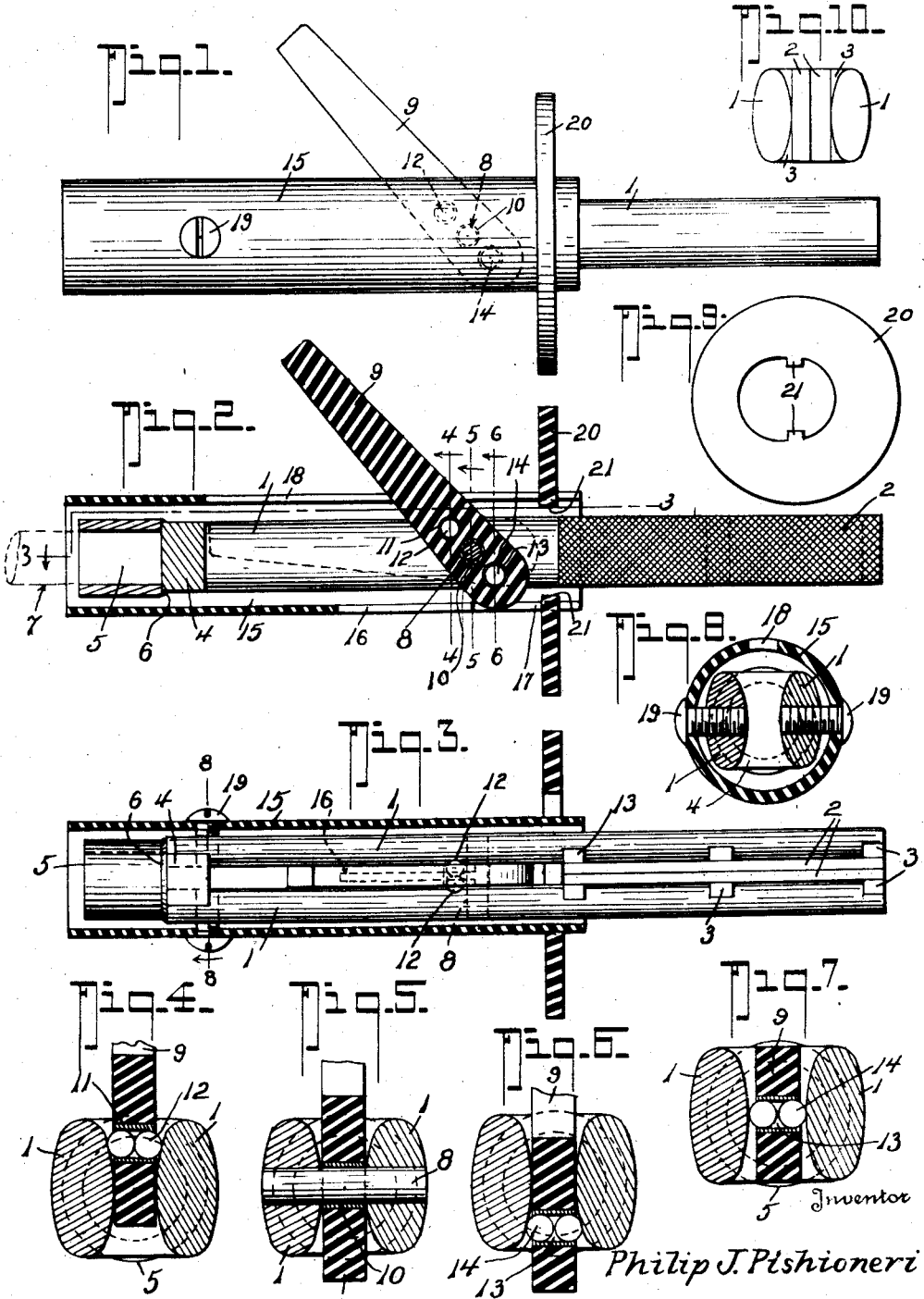

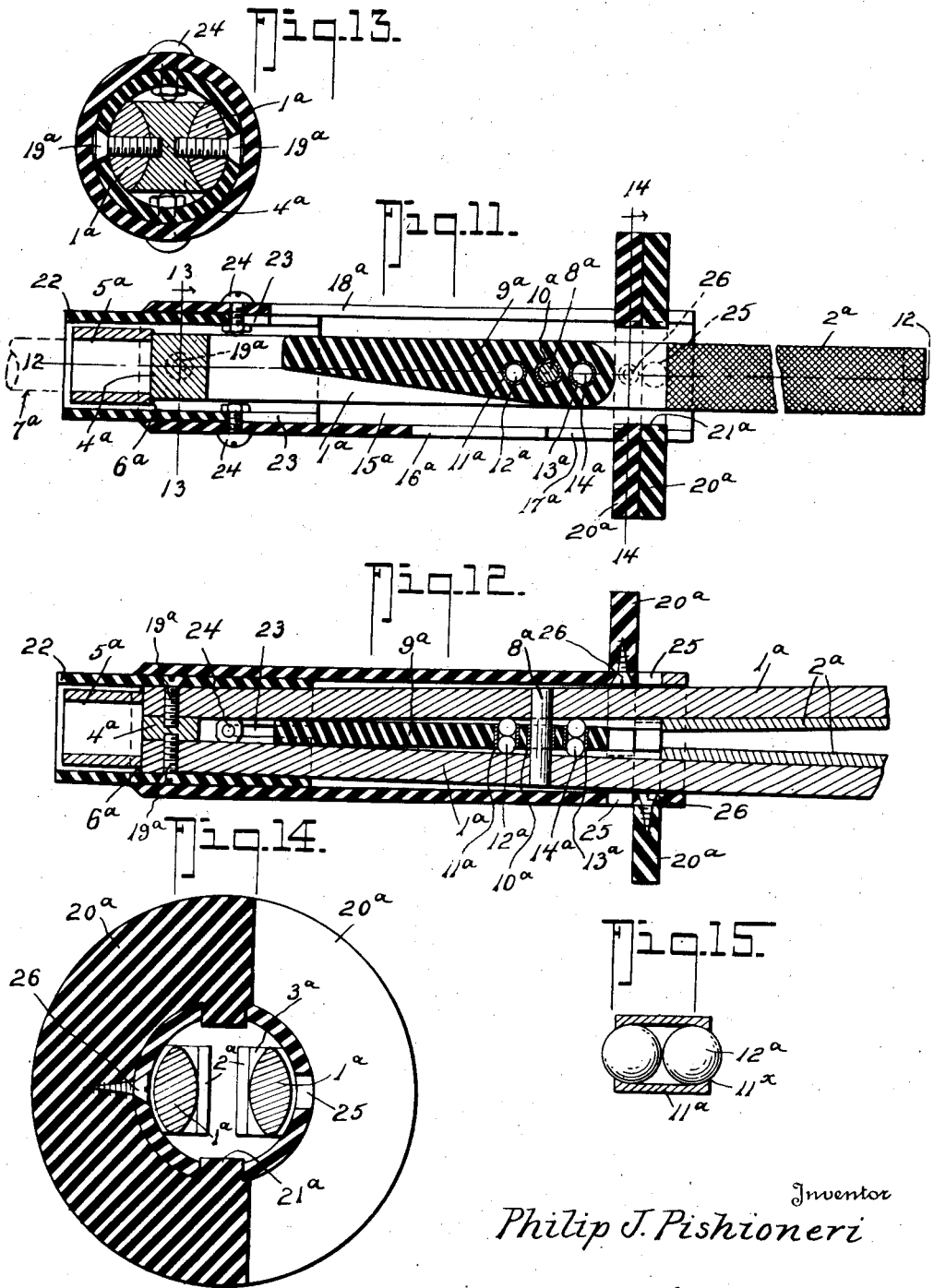

2,196,565

UNITED STATES PATENT OFFICE 2,196,565

ARC WELDER ELECTRODE HOLDER

Philip J. Pishioneri, Ellwood City, Pa.

Application October 31, 1938, Serial No. 238,059

12 Claims. (Cl. 219—8)

My invention relates to a holder used in arc welding and it has among its objects: to provide a holder with improved means to spread the jaws of the holder apart; to provide a spreader which will work freely and easily at all times without the aid of a lubricant which (in those holders requiring the use of a lubricant), due to the heat absorbed by the holder, carbonizes and prevents the mechanism from functioning properly; to provide adequate means to insulate, both electrically and thermally, the jaws and provide a suitable handle for the holder; to provide removable or replaceable jaws; and the provide the jaws with sharply knurled faces, the better to pierce the flux coating on the welding rod and thus ensure good electrical contact.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a side elevation of an embodiment of the invention, the lever being raised to its inoperative position.

Fig. 2 is a central vertical longitudinal section.

Fig. 3 is a section on the line 3—3 of Fig. 2.

Figs. 4, 5 and 6 are, respectively, enlarged cross sections on the lines 4—4, 5—5 and 6—6 of Fig. 2.

Fig. 7 is a view like Fig. 4, but with the lever in the operative or spreading position.

Fig. 8 is an enlarged cross section on the line 8—8 of Fig. 3.

Fig. 9 is a face view, on a reduced scale, of the hand protector disc or ring.

Fig. 10 is a detail end elevation of the jaw end of the clamp member.

Fig. 11 is a view similar to Fig. 2, showing a modification, and with the lever in the operative or jaw-spreading position.

Fig. 12 is a horizontal section on line 12—12 of Fig. 11.

Fig. 13 is an enlarged cross section on line 13—13 of Fig. 11.

Fig. 14 is an enlarged cross section on line 14—14 of Fig. 11.

Fig. 15 is a detail section of one of the ball units.

In the drawings, in which like numbers of reference designate like parts in all the figures, 1 designates a pair of jaw members, of elliptic cross section, which are rigidly secured together at one end by a filler block 4 welded thereto and by a tube 5 welded to the block 4 and jaws 1 as at 6.

The grip plates 2 are secured to the jaws 1 adjacent their other ends by spot welds 3 so as to provide as little heat conducting contact with the jaws 1 as possible, while providing sufficient electrical contact to conduct the welding current efficiently. The foregoing parts are preferably constructed of steel.

The feeder cable 7 is secured in the sleeve or tube 5 in any suitable way.

The jaws 1—1 are of a springy nature and when not acted upon by the spreader lever 9 come together of their own accord. The jaws 1 are spaced apart and the lever 9 of insulation is mounted between the jaws. This lever is provided with a bearing bushing 10 for the fulcrum pin 8 and it carries at either side of its fulcrum a double ball unit (see Fig. 15) composed of a steel sleeve holding two balls side by side. The unit which is between the fulcrum pin 8 and the rear end of the jaws comprises the sleeve 11 and the two balls 12, while the other unit comprises a slightly larger sleeve 13 containing two slightly larger balls 14, so that when the lever 9 is depressed (see dotted lines, Fig. 2, and full lines, Fig. 1 and Fig. 12) it allows for the divergence of the jaws and the application of substantially equal work on each ball unit.

The jaws are removably held in a tube 15 of insulation, which also serves as a handle. This tube has a narrow slit 16 opposite the lower edge of lever 9 rearwardly of the fulcrum 8 and a wide slot 17 forwardly thereof. It also has a wide slot 18 above the lever 9. The slots 17 and 18 are wide enough to permit the lever to project through them (see Fig. 2).

The jaws are held inside the tube 15 and spaced therefrom, to allow air circulation, by insulation screws 19.

A hand guard disc 20 is provided with a hole and with lugs 21 to fit the tube 15 and slots 17 and 18 with a tight fit in the embodiment of the invention just described.

In Figs. 13, 14 and 15 is illustrated another embodiment of the invention. In these figures all parts of substantially the same construction as like parts in Figs. 1 to 10 inclusive, and which function alike, bear the same reference numbers as in Figs. 1 to 10 plus the index letter $a$ so a detailed description of the same will be unnecessary here.

This form differs from that of Figs. 1 to 10 in that instead of mounting the jaws 1$^a$ in the tube 15$^a$ directly by means of insulation screws, the jaws are mounted in a tube spacer 22 to which it is secured by machine screws 19$^a$ and this tube spacer 22 is telescoped into tube 15$^a$ and secured by bolts and nuts 24, which may be metallic, since they do not contact the jaws.

To provide for easy assembly and dis-assembly of the jaws with tube spacer 22 and with tube 15a, the tube spacer 22 is slotted at 23 to slip over the bolts 24 when the nuts are loosened.

Another difference in the second form over the first form resides in the structure of the hand protector which is made in two parts 20a—20a of slightly more than a half circle and these are secured to the tube 15a by wood screws 26, the tube 15a having holes 25 through which a screwdriver may be passed while assembling parts 20a and 15.

When the lever 9, 9a is elevated through slot 18, 18a (see full lines in Fig. 2 and dotted lines in Fig. 1) the balls 12, 12a, and 14, 14a ride the curved surfaces of the jaws to the position of Figs. 7 and 12 from that of Figs. 4 and 6, and thus spread or open the jaws.

When the lever is down (full lines, Figs. 1, 11 and 12) it may be pushed up by inserting a thin piece of wood or other suitable body through slot 16, 16a and pushed until its end emerges from slot 18, 18a, when it will (under the contracting force of the jaws) tend to spring to the raised position, being assisted, when necessary, by the operator's lifting up the free end of the lever.

From the foregoing description, taken with the accompanying drawings, it is thought that the construction, operation and advantages of the invention will be clear to those skilled in the art.

While I have shown and described but two embodiments of the invention, other changes and modifications will doubtless occur to others skilled in the art and I therefore do not wish to limit myself to the specific forms disclosed, but to include all such modifications as come within the scope of the appended claims.

What I claim is:

1. An arc welding electrode holder comprising a pair of jaws arranged side by side and spaced apart, means securing said jaws together at their inner ends, opposed grip plates carried by the outer extremity of said jaws, a lever pivotally mounted on and between said jaws, the opposing faces of said jaws adjacent said lever being curved in cross section, and two ball units carried by said lever, one at either side of the fulcrum, each of said units comprising a ball sleeve with at least two balls projecting beyond the sides of said lever to engage with said curved faces to spread the jaws when the lever is moved to one position.

2. An arc welding electrode holder comprising a pair of jaws arranged side by side and spaced apart, means securing said jaws together at their inner ends, opposed grip plates carried by the outer extremity of said jaws, a lever pivotally mounted on and between said jaws, the opposing faces of said jaws adjacent said lever being curved in cross section, and two ball units carried by said lever, one at either side of the fulcrum, each of said units comprising a ball sleeve with at least two balls projecting beyond the sides of said lever to engage with said curved faces to spread the jaws when the lever is moved to one position, the ball unit at the side of the fulcrum remote from the inner, secured end of the jaws being of a larger size than that nearest the same in order to maintain contact between the balls and the spreading jaws.

3. An arc welding electrode holder comprising a pair of jaws arranged side by side and spaced apart, means securing said jaws together at their inner ends, opposed grip plates carried by the outer extremity of said jaws, a lever pivotally mounted on and between said jaws, the opposing faces of said jaws adjacent said lever being curved in cross section, two ball units carried by said lever, one at either side of the fulcrum, each of said units comprising a ball sleeve with at least two balls projecting beyond the sides of said lever to engage with said curved faces to spread the jaws when the lever is moved to one position, said lever being composed of insulation, an insulation tube into which the jaws and lever are set, means to secure said jaws in said tube, said tube being slotted to permit said lever to pass through the same into and out of the tube, and a hand guard of insulation carried by the tube adjacent the front end of the tube.

4. An arc welding electrode holder comprising a pair of jaws arranged side by side and spaced apart, means securing said jaws together at their inner ends, opposed grip plates carried by the outer extremity of said jaws, a lever pivotally mounted on and between said jaws, the opposing faces of said jaws adjacent said lever being curved in cross section, two ball units carried by said lever, one at either side of the fulcrum, each of said units comprising a ball sleeve with at least two balls projecting beyond the sides of said lever to engage with said curved faces to spread the jaws when the lever is moved to one position, said lever being composed of insulation, an insulation tube into which the jaws and lever are set, means to secure said jaws in said tube, said tube being slotted to permit said lever to pass through the same into and out of the tube, and a hand guard of insulation carried by the tube adjacent the front end of the tube, said tube being spaced from said jaws to provide an air circulation space.

5. An arc welding electrode holder comprising a pair of jaws arranged side by side and spaced apart, means securing said jaws together at their inner ends, opposed grip plates carried by the outer extremity of said jaws, a lever pivotally mounted on and between said jaws, the opposing faces of said jaws adjacent said lever being curved in cross section, two ball units carried by said lever, one at either side of the fulcrum, each of said units comprising a ball sleeve with at least two balls projecting beyond the sides of said lever to engage with said curved faces to spread the jaws when the lever is moved to one position, said lever being composed of insulation, an insulation tube into which the jaws and lever are set, means to secure said jaws in said tube, said tube being slotted to permit said lever to pass through the same into and out of the tube, and a hand guard of insulation carried by the tube adjacent the front end of the tube, said means to secure said jaws in said tube comprising insulation screws.

6. An arc welding electrode holder comprising a pair of jaws arranged side by side and spaced apart, means securing said jaws together at their inner ends, opposed grip plates carried by the outer extremity of said jaws, a lever pivotally mounted on and between said jaws, the opposing faces of said jaws adjacent said lever being curved in cross section, two ball units carried by said lever, one at either side of the fulcrum, each of said units comprising a ball sleeve with at least two balls projecting beyond the sides of said lever to engage with said curved faces to spread the jaws when the lever is moved to one position, said lever being composed of insulation, an insulation tube into which the jaws and lever are set, means to secure said jaws in said tube, said tube being slotted to permit said lever to pass through the same into and out of the tube, and a hand guard of insulation carried by the tube adjacent the front end of the tube, said means to secure said jaws in said tube comprising a telescoped insulation tube spacer, screws connecting said tube spacer to said jaws, the heads of said screws being covered by said first mentioned tube into which said tube spacer is telescoped, and other fasteners out of contact with said jaws for connecting said tube and tube spacer together.

7. In an electrode holder, a pair of jaws having gripping surfaces, an insulation tube in which the jaws are mounted, and an insulation hand guard mounted on said tube, said gripping surfaces projecting outside said tube and said hand guard being located adjacent the end of said tube which is adjacent said gripping surfaces, said hand guard comprisng two over-lapped half-discs, screws passing through said tube from the inside into said half-discs to secure them to the tube, said tube having screw-driver holes at points opposite said screws.

8. In an electrode holder, a pair of jaws having gripping surfaces, an insulation tube in which the jaws are mounted, and an insulation hand guard mounted on said tube, said gripping surfaces projecting outside said tube and said hand guard being located adjacent the end of said tube which is adjacent said gripping surfaces, said hand guard comprising two overlapped half-discs, screws passing through said tube from the inside into said half-discs to secure them to the tube, said tube having screw-driver holes at points opposite said screws, said tube being slotted and said half-discs having portions projecting into the slots.

9. In an arc welder electrode holder, a pair of elongated parallelly disposed spaced-apart metal jaws of elliptic cross section, a filler block between said jaws at one end, a metal tube, means securing said tube, said filler block and said jaws together as a unitary structure, grip plates carried by said jaws at their other end, an insulation lever pivoted to and between said jaws intermediate said filler block and said grip plates, a ball unit mounted in said lever at each side of its pivot, each ball unit comprising a ball-carrying sleeve and at least two balls contacting one another in a line transversely of the lever, the balls at each side of the lever projecting beyond the sides of the lever to operatively engage said jaws for spreading the jaws when the lever is in one position, said lever being constructed to lie completely between the jaws within the compass of the same when in the spreading position, a tube of insulation enclosing said jaws except the grip-plate portions thereof, insulated means to secure said tube of insulation to said jaws, said tube of insulation having a longitudinal slot to permit projecting of said lever when desired, and an insulation hand guard on said tube of insulation between the lever's position and that of said grip plates.

10. In an arc welder electrode holder, a pair of elongated parallelly disposed spaced-apart metal jaws of elliptic cross section, a filler block between said jaws at one end, a metal tube, means securing said tube, said filler block and said jaws together as a unitary structure, grip plates carried by said jaws at their other end, an insulation lever pivoted to and between said jaws intermediate said filler block and said grip plates, a ball unit mounted in said lever at each side of its pivot, each ball unit comprising a ball-carrying sleeve and at least two balls contacting one another in a line transversely of the lever, the balls at each side of the lever projecting beyond the sides of the lever to operatively engage said jaws for spreading the jaws when the lever is in one position, a tube of insulation enclosing said jaws except the grip-plate portions thereof, insulated means to secure said tube of insulation to said jaws, said tube of insulation having a longitudinal slot to permit projecting of said lever when desired, and an insulation hand guard on said tube of insulation between the lever's position and that of said grip plates.

11. In an arc welder electrode holder, a pair of elongated parallelly disposed spaced-apart metal jaws of elliptic cross section, a filler block between said jaws at one end, a metal tube, means securing said tube, said filler block and said jaws together as a unitary structure, grip plates carried by said jaws at their other end, an insulation lever pivoted to and between said jaws intermediate said filler block and said grip plates, a ball unit mounted in said lever at each side of its pivot, each ball unit comprising a ball-carrying sleeve and at least two balls contacting one another in a line transversely of the lever, the balls at each side of the lever projecting beyond the sides of the lever to operatively engage said jaws for spreading the jaws when the lever is in one position, a tube of insulation enclosing said jaws except the grip-plate portions thereof, insulated means to secure said tube of insulation to said jaws, said tube of insulation having a longitudinal slot to permit projecting of said lever when desired, an insulation hand guard on said tube of insulation between the lever's position and that of said grip plates, said means to secure comprising an insulation tube spacer secured to said jaws at one place, said tube spacer being telescoped in said tube of insulation, and fastening means between said tube spacer and said tube of insulation, which means is out of contact with said jaws.

12. In an arc welder electrode holder, a pair of elongated parallelly disposed spaced-apart metal jaws of elliptic cross section, a filler block between said jaws at one end, a metal tube, means securing said tube, said filler block and said jaws together as a unitary structure, grip plates carried by said jaws at their other end, an insulation lever pivoted to and between said jaws intermediate said filler block and said grip plates, a ball unit mounted in said lever at each side of its pivot, each ball unit comprising a ball-carrying sleeve and at least two balls contacting one another in a line transversely of the lever, the balls at each side of the lever projecting beyond the sides of the lever to operatively engage said jaws for spreading the jaws when the lever is in one position, a tube of insulation enclosing said jaws except the grip-plate portions thereof, insulated means to secure said tube of insulation to said jaws, said tube of insulation having a longitudinal slot to permit projecting of said lever when desired, an insulation hand guard on said tube of insulation between the lever's position and that of said grip plates, said means to secure comprising an insulation tube spacer secured to said jaws at one place, said tube spacer being telescoped in said tube of insulation, and bolts and nuts securing said tube spacer to said tube of insulation, said tube of insulation having a slotted end to receive said bolts.

PHILIP J. PISHIONERI.